Aug. 23, 1927.
P. L. CLARK
1,639,925
POWER TRANSMITTING DEVICE
Filed April 28, 1924    3 Sheets-Sheet 1
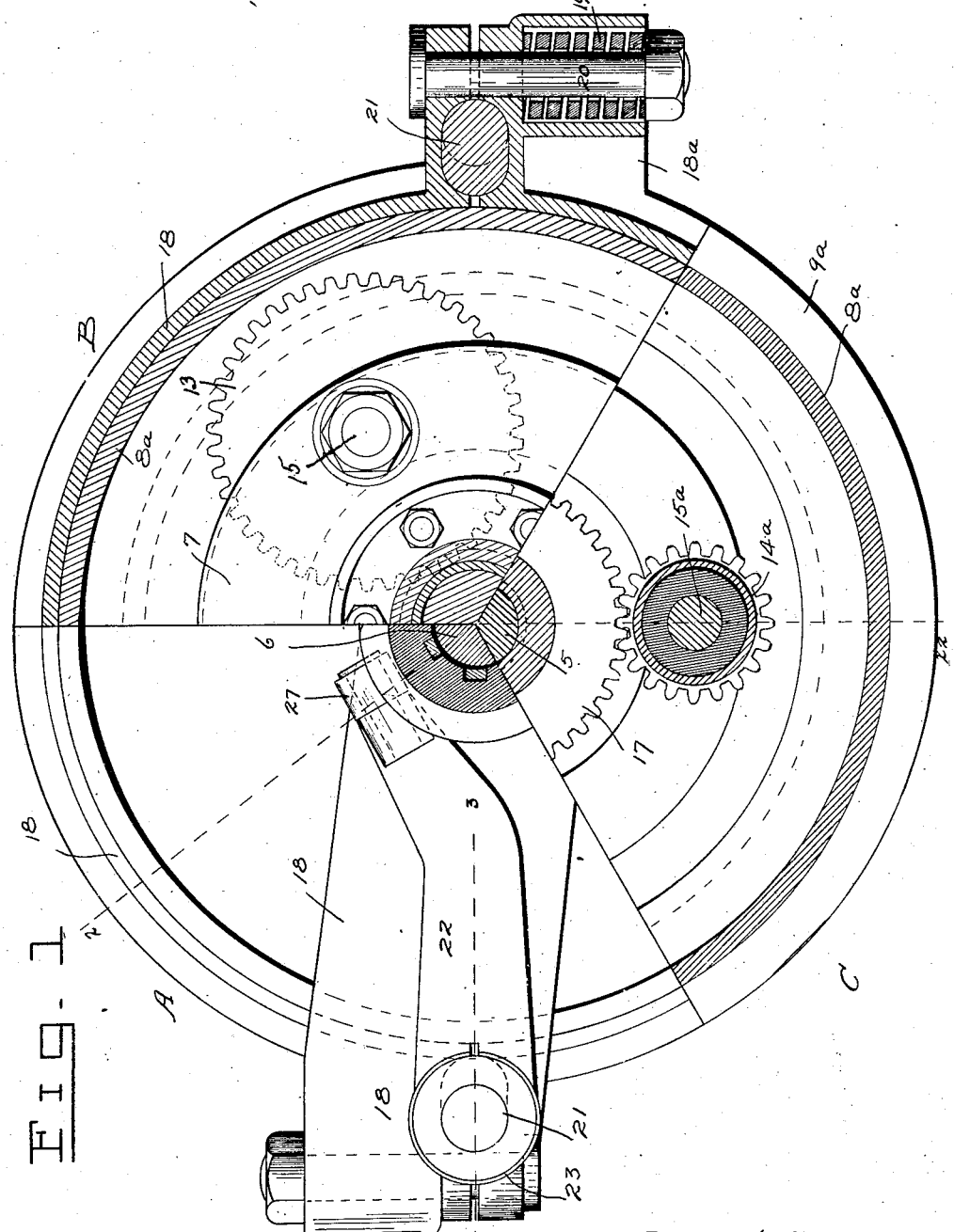
Fig. 1
Inventor
Philippe L. Clark, deceased.
Roy A. Kirkpatrick, Executor.

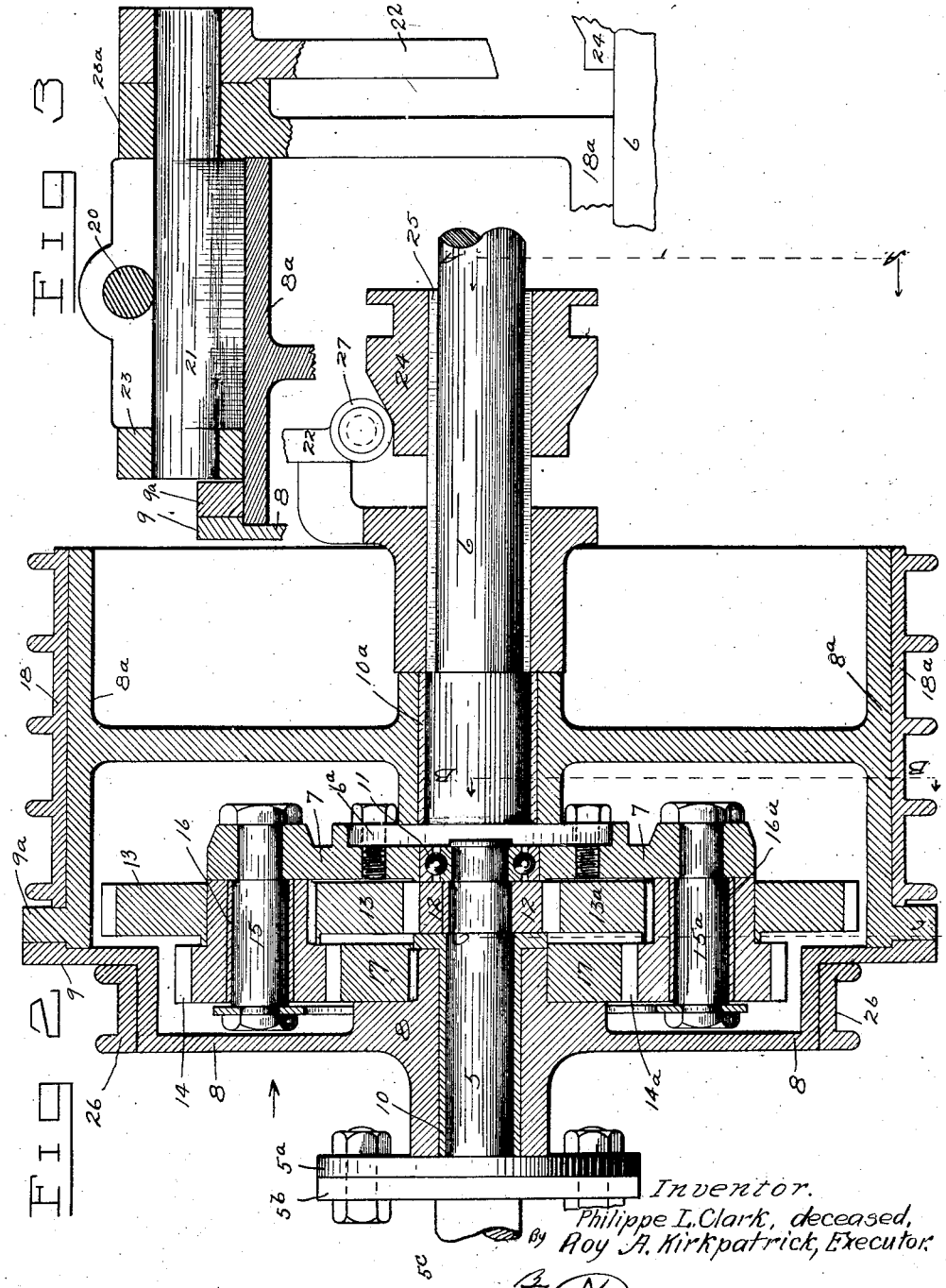

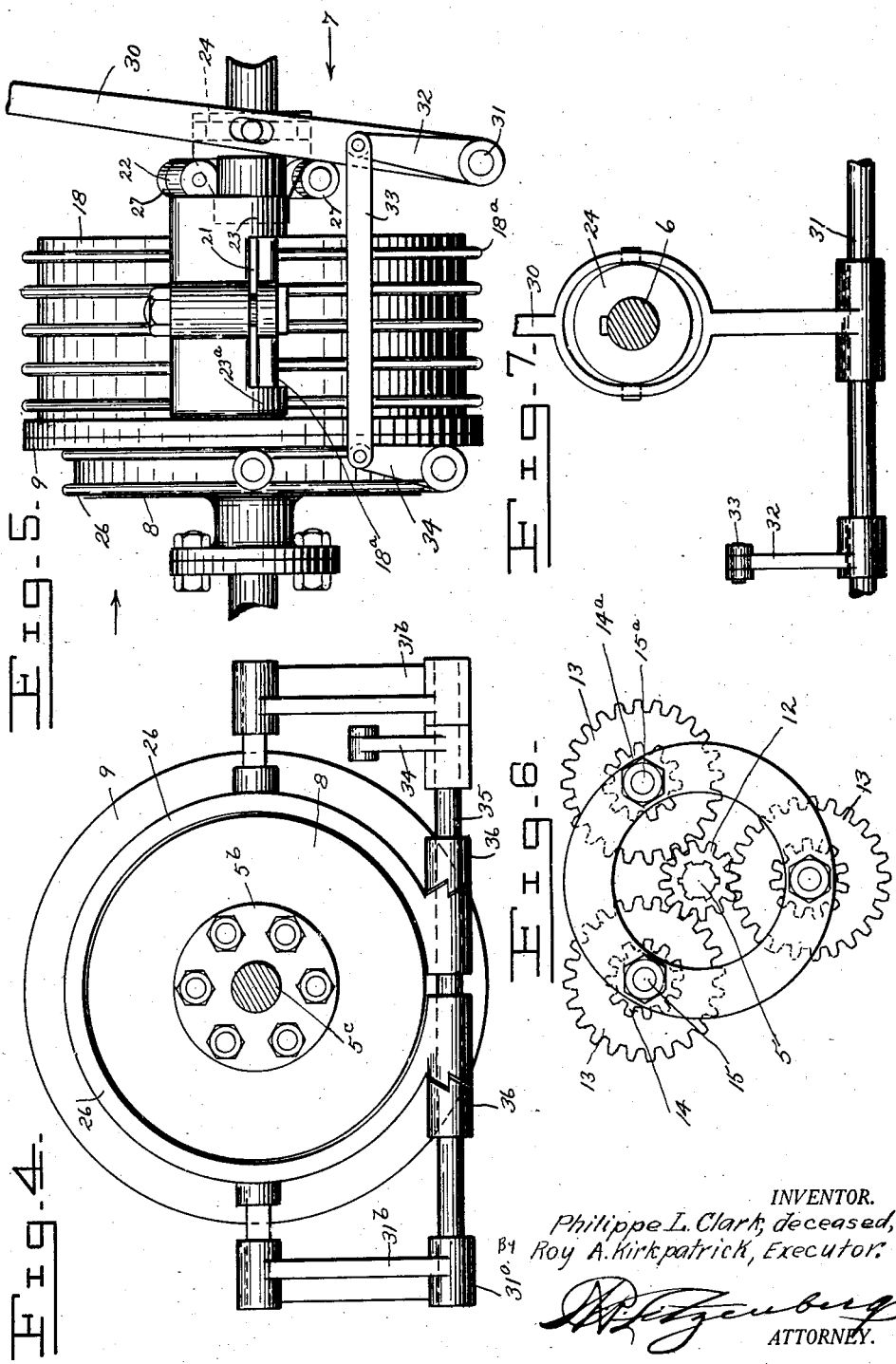

Patented Aug. 23, 1927.

1,639,925

UNITED STATES PATENT OFFICE.

PHILIPPE LYONS CLARK, DECEASED, LATE OF LOS ANGELES, CALIFORNIA, BY ROY A. KIRKPATRICK, EXECUTOR, OF LOS ANGELES, CALIFORNIA, ASSIGNOR TO ANNIE CLARK.

POWER-TRANSMITTING DEVICE.

Application filed April 28, 1924. Serial No. 709,392.

The invention is illustrated in the accompanying three sheets of drawings, in which,—

Figure 1, part A, a sectional view on line $x^a$—$x^a$, of Fig. 2;

Figure 1, part B, a sectional view on line $x^b$—$x^b$, of Fig. 2;

Figure 1, part C, a sectional view on line $x^c$—$x^c$, of Fig. 2;

Figure 2 is a vertical sectional view on line $x^2$—$x^2$ of Fig. 1;

Figure 3 is a fragmentary sectional view on line $x^3$—$x^3$ of Fig. 1;

Figure 4 is an end view of the clutch mechanism shown in Fig. 5;

Figure 5 is a side view thereof with parts omitted;

Figure 6 is a detail view showing the gear mechanism in said device; and

Figure 7 is a detail view looking at the right hand end of Fig. 5.

Referring to the drawings in detail, 5 is a stub-shaft, provided with a flange $5^a$, connecting it to a similar flange, $5^b$, of a fly wheel shaft $5^c$. 6 is another stub-shaft for connection with the load, and is provided with a flange $6^a$ for connection to a spider numbered 7. 8 and $8^a$ are two sections of a revoluble drum having the two connecting flanges 9 and $9^a$, the drum being mounted upon the stub-shafts 5 and 6, with journal bushings 10 and $10^a$. Stub-shaft 5 runs in ball bearings, 11, recessed in spider 7, while pinion 12 is keyed to the same stub-shaft and engages gears 13 and $13^a$. Keyed to gears 13 and $13^a$ are the pinions 14 and $14^a$. These combined gears and pinions are journaled upon studs 15 and $15^a$, which are connected to spider 7 and provided with bushings 16 and $16^a$. 17 is another gear which is keyed to drum 8, and is revoluble around stub-shaft 5 with said drum. Pinions 14 and $14^a$ mesh with this last gear 17 and thus pinions 12, 14 and $14^a$, together with gears 13, $13^a$ and 17, constitute a constantly meshed train, of which pinion 12 and gear 17 are the first and last members, respectively. 18 and $18^a$ are corresponding parts of an external contracting band frictional power clutch, which encircles the periphery of the drum $8^a$, keyed to the stub-shaft 6 and is revoluble therewith. Two springs are provided for clutch power, one of which is shown at 19, while 20 shows the spring stud. 21 is an eccentric rocker for compressing the spring to release the clutch, and 22 is a lever for actuating the rocker. 23 and $23^a$ are bearings formed upon 18 and $18^a$, in which the rockers are journaled. 24 is a sliding cone mounted on the key 25 and locked axially on stub-shaft 6, designed to actuate lever 22. 26 is a friction brake attached to drum 8, and controlled by external connection not shown, and 27 is a roller on lever 22, for reducing the friction of engagement with cone 24.

The invention relates to the planetary type of power transmission devices and is adaptable to any kind of power installation; but its primary purpose is the flexible and efficient conversion of the explosive impulse of an internal combustion engine into useful work, and by flexible and efficient is meant the transmission and conversion of the full torque of the crank-shaft at any and such variations of speed ratios between the power and the load as the fluctuations of the load may require, in contra-distinction to the existent arbitrary and limited variations and loss of efficiency in common practice.

To accomplish the purpose, the stress of the explosive impulse is divided and applied to the movement of the load through two separate and distinct connections between the driving shaft and the driven shaft. The means employed are tools of universal use and reliable efficiency. The results are due to their form of assembly and the advance made in the art is the production of a flexible, efficient, power transmitting device of universal application and economic construction.

By reference to the drawings it will be seen that the driving member of the device is the stub-shaft 5, which is designed to connect to the crank shaft of the engine through the fly-wheel (not shown). This stub-shaft shall hereafter be referred to as the driving member and the engine shall be referred to as the motor. The stub-shaft 6 is the driven shaft connected with the load and this shall be referred to as the driven member. It will be obvious that the driven member is always the load and that any reference to it is a reference to the load. Between the driving member and the driven member there are two connections which are possible mediums for the transmission of the torque of the driving member to the driven member, viz, first, through the clutch, when it is in any degree of frictional engagement, and second, at the studs, where clutch resistance to the synchronistic rotation of the gears must create a differential planetary stress upon the studs and spider. Obviously, the full torque of the driving member cannot be transmitted through the clutch, since the friction of its engagement with the drum 8ª, by resisting this synchronatic meshing of the gear train will retard the rotation of the intermediate gears and pinions and thus throw the stress of the torque onto the studs, thereby, acting in conjunction with and supplemented by that part of the stress transmitted to the load through the clutch, starting a differential planetary movement of the spider and driven member, in the direction of the torque of the driving member. It will thus be seen that the stress of the explosive impulse will be divided and transmitted to the load partly through the clutch and partly through the spider, the two working conjointly, concurrently, efficiently and independently of any gear ratios.

The basic principle of the invention is the conversion of an idling free rotation of gears or their equivalent journaled upon studs connected with the load, into a differential planetary stress upon such studs, such stress to be an efficient effort in the direction of moving the load and to be superinduced by a controllable interposed resistance to the rotation of the gears and such resistance to be so connected to and supported by the load as to be an efficient supplementary effort to move the load, the combined efforts to be the equivalent of the full torque of the crankshaft.

The first essential requirement of the operation of the principle is a resistance to the synchronistic meshing of the gear train, such resistance to be interposed between the last gear of the train and the driven member and so connected to the driven member at a point external to the spider 7, as to effectively and efficiently convert the stress or friction of the resistance into a pull upon the driven member in the direction of the torque of the driving member. In the form illustrated the invention makes this resistance the fundamental function of the clutch, and the drum the medium for the interposition of the resistance.

It may conduce to a more thorough understanding of the principle upon which the invention is based, to consider the clutch in the nature of a lever using the driven member for a fulcrum, the clutch spring pressure for its power and the opposition of the torque of the driving member for its load. The master pinion 12, on the driving member 5, may then be considered as another lever with the torque of the crank-shaft for its power, the spider 7 as its fulcrum and the clutch produced resistance of the drum 8 as its load. Thus considered, the driven member becomes the fulcrum of the two forces which meet in opposition at the studs. This opposition is a check to the rotation of the gears, and, through the studs, becomes a planetary stress upon the spider. The disturbance in the synchronistic meshing of the gear train can only be compensated by a planetary movement equivalent to the retardation in axial rotation of the gears on the studs. When therefore, the sum of the opposition at the studs exceeds the stability of the fulcrum, the spider gives way under the combined stress and the load moves in response to a differential planetary stress which is the equivalent of the full torque of the crank-shaft.

While the load will move whenever the combined forces at the studs are in excess of the stability of the fulcrum, the application of the necessary forces may vary in ratio, so long as the sum of the two is in excess of the required power. The initial movement of the load will be at the greatest possible multiplication. Its speed will increase and multiplication decrease as clutch resistance and motor speed are increased until the transmission is locked in direct drive. Between these two points, the highest and the lowest, the ratio of multiplication will be governed by the amount of applied clutch resistance. It is thus manifest that the primary function of a clutch is that of creating a resistance which will throw stress upon the studs and thereafter maintaining or varying the ratios between the clutch resistance and the torque of the driving member, as the character of the work may require.

The means and method to be adopted for operating and controlling the device must be determined in each case by the character of the required service and nature of the installation. In motor car service, which is one of its most obvious applications and at the same time the most severe, every movement of the car is controlled with one lever which operates with one foot pedal which is the equivalent in action and operation of the standard clutch pedal. The car is also provided with an emergency brake, for locking when not running.

The operation of the transmission in an auto car is as follows:

With the motor running and the clutch disengaged, the drum idly rotates on both stub-shafts at the velocity due to the motor speed and gear ratios. To start the car the pedal is released and the clutch gradually allowed to come into full engagement the load being picked up without shock or jar, as soon as the combined stress at the studs is sufficiently great and the acceleration being determined by the speed with which the clutch is allowed to come into engagement. The acceleration is without shock or undue strain, however rapid and as soon as the clutch is in full engagement the device is locked in direct drive with the motor.

When running in direct drive and multiplication becomes necessary, very slight pedal depression will give the necessary spring tension release and the response of the load will always indicate the correct clutch slip. There can be no separation of clutch surfaces throughout the range of multiplication, but only a reduction in spring tension. With proper spring adjustment, the slightest reduction in tension will permit a slip which will instantly result in a differential movement at the studs and change the ratio of movement between motor and load without loss of efficiency. Smooth metal surfaces, large frictional area and every inch in perfect contact, will give the ideal clutch.

To check and stop the forward momentum of the car the brake band 26 is designed, as well as to provide the reverse movement of the load. The brake is so connected as to be operated by a lever which engages with the pedal at the point and moment when the clutch is fully disengaged. Depression of the pedal below that point operates and controls the brake. To check the forward movement of the load therefore, the motor is first disengaged from the load by disengagement of the clutch. Further depression of the pedal then applies the brake to the drum and this forms an external connection and resistance to the rotation of the drum and gear 17. Thus gear 17, by externally resisting the movement of the gear train, causes the intermediate gears and pinions to resist, through the studs, the rotation of the spider and forward momentum of the load; and consequently, as the rotation of the drum decreases the movement of the load is correspondingly decreased until they both come to a full stop. The full power of the motor working in conjunction with the brake is thus available for checking, controlling and stopping the forward movement or momentum.

The reverse movement of the load is secured by application of the brake when the load is at a standstill, or by continued application immediately following a complete check to the forward movement. The external check to the rotation of gear 17 is a resistance and check to the axial rotation of the intermediate gears, which latter check is transmitted as a reverse stress to the studs and spider and starts the intermediate gears 13 and 13ª in a planetary movement in reverse around pinion 12, pinions 14 and 14ª at the same time making a track in reverse of gear 17. The change in action which takes place as the brake is applied is first, from an idle axial rotation of the intermediate gears, to a gradually decreased axial rotation and an equivalent planetary movement of the spider and load, in reverse direction; the reverse being the equivalent of the differential stress due to the axial check while the brake is slipping, and at the positive speed due to the gear ratios, when the drum has been brought to a full stop by the locking of the brake.

Speed ratios between power and load will always be independent of the ratios of the gear train, excepting in reverse. Forward ratios will depend upon the varying and controllable relation between the differential movement and the axial rotation and this will be controlled by the slip of the clutch and limited only by the effective range of such slip, which will be in proportion to the frictional area of the clutch faces.

When the required multiplication and consequent slipping of the clutch covers short and infrequent intervals, the question of frictional heat will be one of negligible quantity; but to guard against the dangers of overheating, clutch surfaces should always be of metal to metal. In automobile and motor truck practice, the use of an external contracting band clutch with Kelly metal lining will obviate any trouble from that cause and provide long life and smooth action.

The device constructed as shown by the drawings herewith, is but one of many possible designs and is offered only as an illustration of a principle which, so far as known has not previously been conceived; and it must be understood that the device is not limited to this form of construction, but claim the right to any and all variations in constructive detail which will transmit and efficiently convert a motor impulse, through the medium of two connections and the creation of a differential movement between the motor and the load substantially in accordance with the principle herein developed.

Referring to Figs. 4, 5 and 7, the clutch pedal is indicated as 30, and is pivotally mounted on a shaft 31, having bearings 31ª, 31ª, in frame members, 31ᵇ, 31ᵇ. A lever or arm 32 on said shaft 31, is connected by means of a link 33, to lever 34, on a shaft 35, through which the brake band 26, is operated. This is accomplished through the sleeve cams 36, 36, and is for the purpose of reversing the direction of the drive, as will be understood.

Thus is provided a new transmission mechanism for transmitting power from one member to another, with means interposed therebetween for varying the power as required until direct drive is accomplished. The invention is not limited except by the hereto appended claims.

Having fully described said invention, what is claimed and desired to be secured by Letters Patent is,—

1. In a power transmission mechanism, in combination, two shafts in alinement with each other, a drum revolubly mounted on the adjacent ends of said shafts and having bearings on each shaft, a gear on one of said shafts to be driven thereby, a planetary gear train interposed between said gear and said drum, said drum having a gear in connection therewith and forming a part of said gear train, a friction brake band exteriorly of said drum and adapted to hold the same for reverse drive means for operating the same, an external contracting band frictional power clutch encircling said drum and keyed to one of said shafts, and means for operating said power clutch as required.

2. In a power transmission mechanism, in combination, a driven member and a driving member, a drum having bearings on both of said members to turn thereon, a gear on said driving member, a gear on said drum, a train of gears interposed between the gears of said member and drum, whereby the driving of one member drives the other through said train of gears, a friction brake band exteriorly of said drum, means for operating the same to cause reverse drive from one member to the other, an external contracting band frictional power clutch encircling said drum and connected to one of said members, and means for operating the same as a clutch, for the purpose described.

3. In a power transmission mechanism, in combination, a driving member, a driven member, a drum enclosing both and having bearings to turn on both of said members, a planetary train of gears interposed between said drum and said driving member and driven from said driving member, a friction brake band around the exterior of said drum and connected for holding it for reverse drive means for operating the same, and external contracting band frictional power clutch also encircling said drum and connected to one of said members, and means for operating the same, whereby clutch action can be had between said driving and said driven members.

4. In a power transmission mechanism, in combination, a drive shaft, a driven shaft in alinement with each other with their ends adjacent, a drum over said adjacent ends and having bearings on both of said shafts, said drum being of different diameters axially thereof, a planetary gear train interposed between said drum and driven member for transmitting power from one to the other, said gear train being driven from said drive shaft, a friction brake band around one portion of said drum and connected for holding the same to establish reverse drive, an external contracting band frictional power clutch encircling another portion of said drum and connected for operation as a slip clutch, and means for operating the same.

5. In a power mechanism, in combination, a driving member, a driven member, a drum enclosing both of said members, a gear on the inside of said drum, a planetary train of constantly meshing gears interposed between said gear and said driven member, said gears being driven from said driving member, two different friction band members around said drum, one of said members being operable as a brake and for reverse movement, and the other being operable as a slip clutch, and means for manually operating said band members, for the purposes described.

Signed at Los Angeles, Los Angeles County, California, this 22nd day of April, 1924.

ROY A. KIRKPATRICK,
*Executor of the Estate of Philippe Lyons Clark, Deceased.*